United States Patent [19]
Brown

[11] Patent Number: 4,890,960
[45] Date of Patent: Jan. 2, 1990

[54] VACUUM METERING DRUM ASSEMBLY
[75] Inventor: Elliott D. Brown, Salinas, Calif.
[73] Assignee: Raymond Production Systems Corporation, Hollister, Calif.
[21] Appl. No.: 255,768
[22] Filed: Oct. 11, 1988
[51] Int. Cl.⁴ ............................................. B41F 13/04
[52] U.S. Cl. .......................................... 406/80; 406/88
[58] Field of Search ...................... 406/80, 86, 87, 88, 406/89, 90, 91, 92; 198/380, 803.5

[56] References Cited
U.S. PATENT DOCUMENTS

| | | | |
|---|---|---|---|
| 1,900,781 | 3/1933 | Wardley | 406/88 |
| 3,447,663 | 6/1969 | Sarovich | 198/41 |
| 3,754,635 | 8/1973 | Modjen | 198/41 |
| 3,760,453 | 9/1973 | Neumann | 15/304 |
| 3,873,163 | 3/1975 | Gladish | 406/88 |
| 4,182,586 | 1/1980 | Lenhart | 406/87 |
| 4,225,034 | 9/1980 | Sarovich | 198/607 |
| 4,337,856 | 7/1982 | Dorner | 198/599 |
| 4,456,406 | 6/1984 | Lenhart | 406/88 |
| 4,673,080 | 6/1987 | Bartylla | 198/689.1 |
| 4,781,494 | 11/1988 | Cedrone et al. | 406/88 |

Primary Examiner—Sherman D. Basinger
Assistant Examiner—Stephen P. Avila
Attorney, Agent, or Firm—Limbach, Limbach & Sutton

[57] ABSTRACT

A metering drum assembly for the rotation of can-shaped objects over a surface from a first to second location. The drum device employs an inner, hollow, non-rotating, cylindrical member and an outer, hollow, rotating, cylindrical member, each cylindrical member being oriented about the same longitudinal axis. A vacuum is drawn within the inner, hollow, non-rotating, cylindrical member pulling air through the perforated surface of the outer, hollow, rotating, cylindrical member only across a defined segment of orientation.

12 Claims, 3 Drawing Sheets

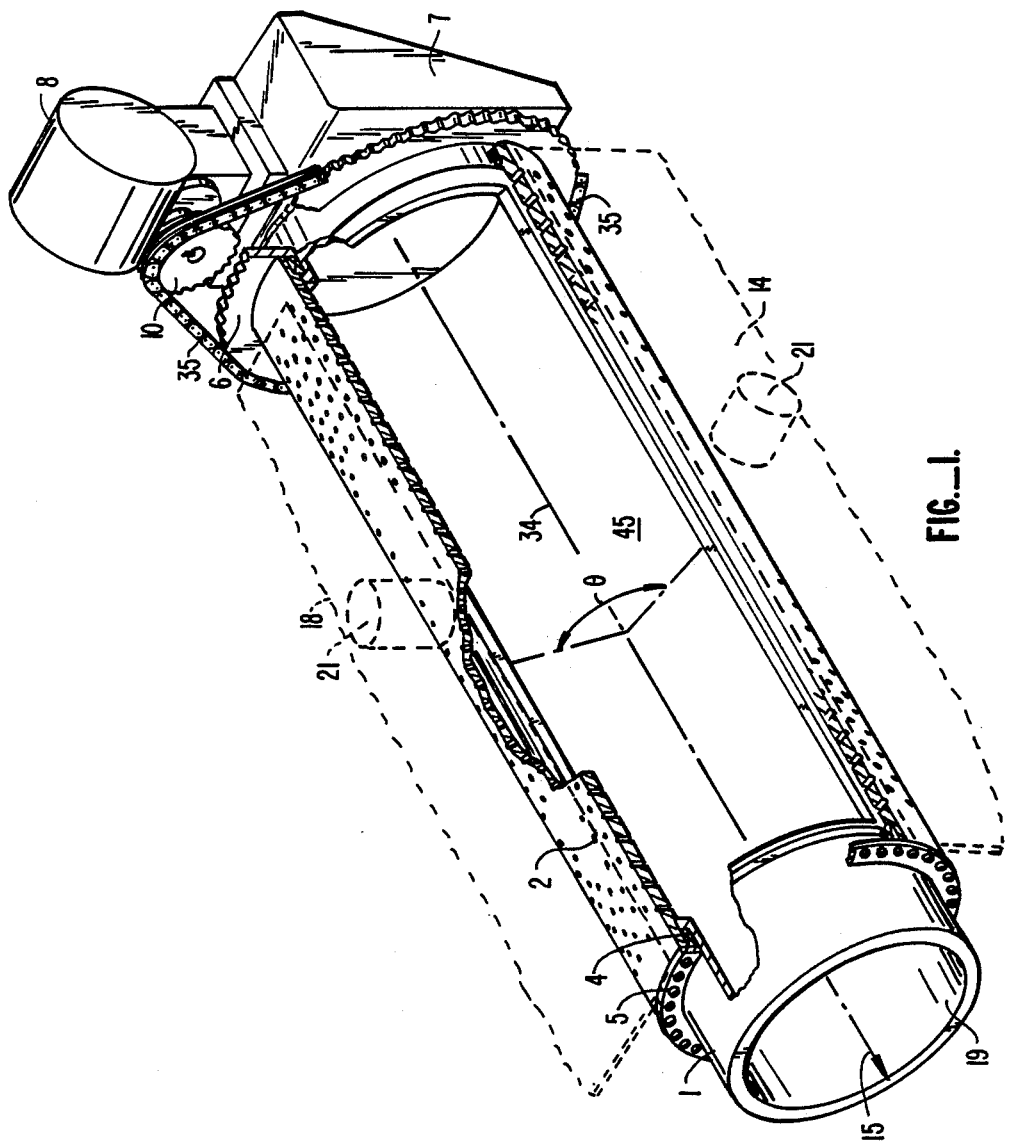
FIG._1.

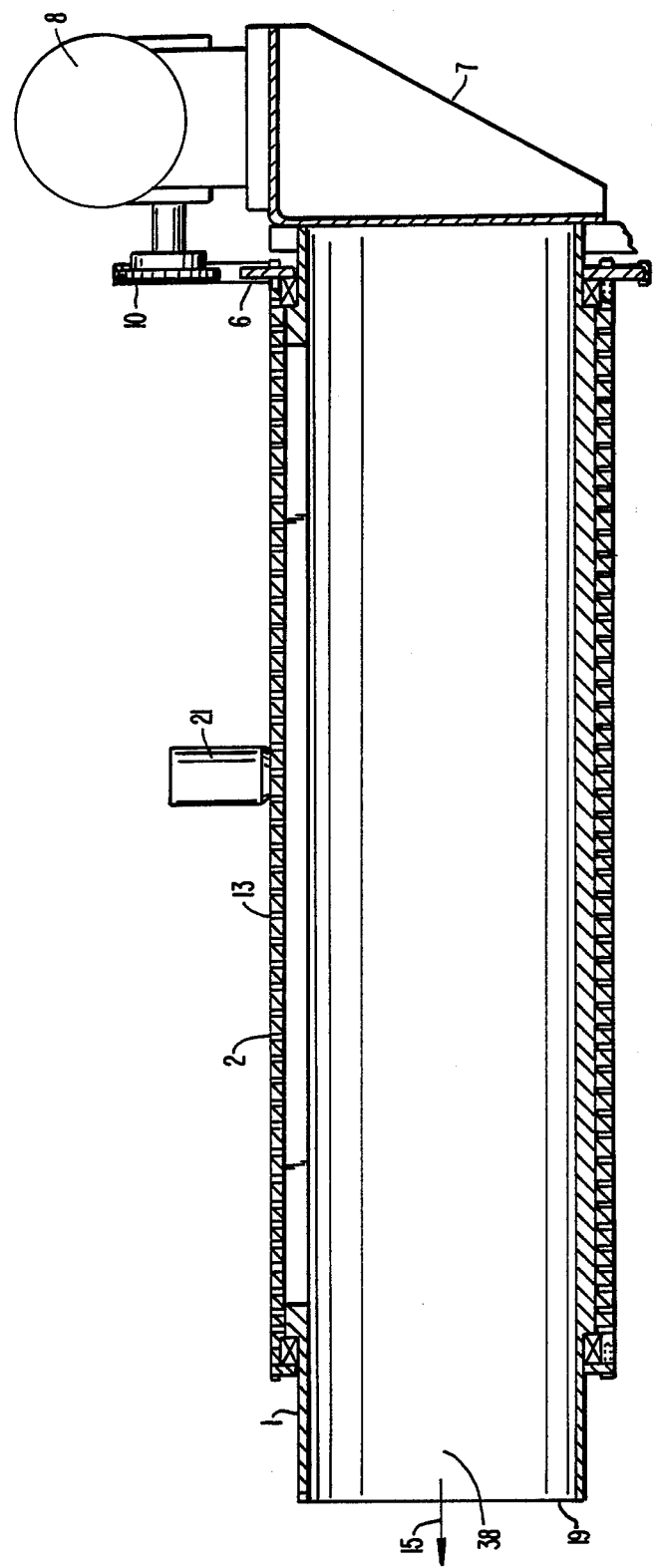

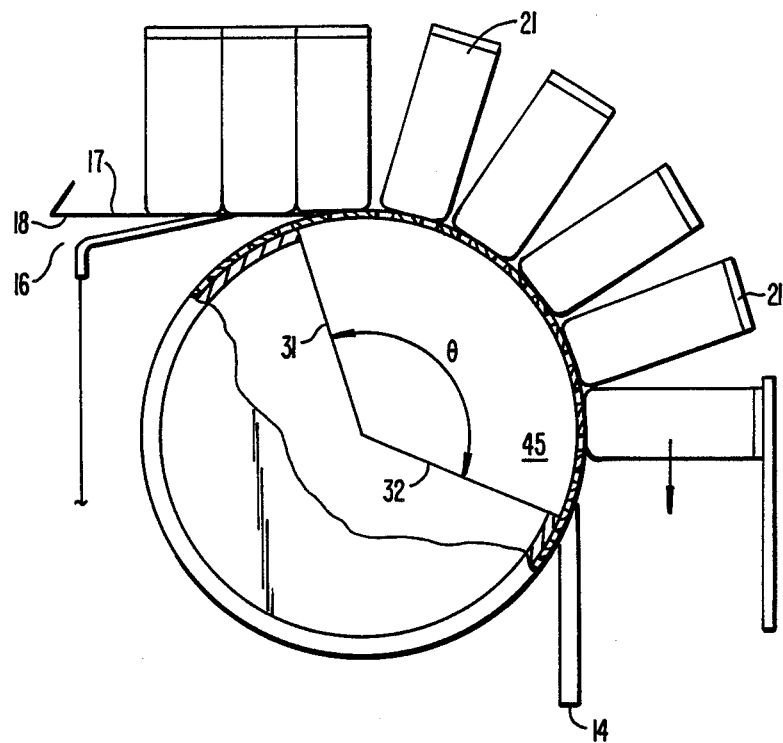
FIG._3.

VACUUM METERING DRUM ASSEMBLY

TECHNICAL FIELD OF INVENTION

The present invention relates generally to the mass transport of articles, such as can-shaped containers from a first location at a vertical orientation to a second location at a horizontal orientation. This invention can be most advantageously employed in removing can-shaped objects from the surface of an air conveyor while feeding the objects to an air single filer avoiding can damage and in providing for the metering of the can-shaped objects in a positive controlled fashion.

BACKGROUND OF THE INVENTION

In many manufacturing operations, particularly in the manufacture of cylindrical containers such as two-piece, ferrous or aluminum cans, it is necessary to mass transport such articles, either in single file or en massé. Such containers are characteristically quite unstable, particularly at present-day line speeds which are capable of handling up to approximately 2,500 articles per minute.

Present-day aluminum, two-piece cans possess can bodies having almost paper thin side walls. During processing, the can bodies are caused to engage a number of work areas including washing, decorating and necking stations. When moving from one station to the next, the can bodies either travel on a moving belt or, more advantageously, upon an air conveyor consisting of a plenum having openings for the directional supply of air from the upper deck surface. Devices of this nature are described in U.S. Pat. No. 4,456,406, the disclosure of which is incorporated herein by reference. However, it is oftentimes necessary to change the vertical orientation of the can bodies as well as to convert the flow of cans from an en massé multi-row configuration to a single file orientation, particularly when the can bodies are to be decorated and necked.

Air single filers, euphemistically known as doubling boxes, are exceedingly well known in can processing operations. For example, one such device is disclosed in U.S. Pat. No. 4,182,586, the disclosure of which is hereby incorporated by reference. Conventionally, the input or upstream end of the air single filer would be fed by a waterfall which, as the name implies, simply consists of a curved slide which transcribes a circular drum across which cans travel while rotating 90° to achieve a horizontal orientation, at which point they fall into the upstream end of the single filer. A curved top guide surface prevents the cans from tumbling due to the small clearance between the guide and the top of the can.

The use of a waterfall in feeding a single filer, or any other device for that matter, possesses a number of inherent shortcomings. Quite obviously, the dropping of cans en massé from a waterfall to a lower collection area can and oftentimes does result in damage being inflicted to the container side walls. This is a particular problem today as aluminum beverage containers have been provided with exceedingly thin side walls as an aluminum saving expedient.

When the flow of container bodies was to be interrupted, prior waterfall installations would employ a gate which would physically impede the entrance to the single filer which, itself, oftentimes causes can damage. The gate regulates can flow by capturing a row of cans laterally across a conveyor with a pressure pad that clamps the row of cans between the pad and the conveyor deck surface. When the gate is closed, the pad is applied which clamps the cans, thus stopping the flow. When the gate is open, the pad is released and the cans are free to move. The clamping action applies a force to the can bodies which can result in their damage.

When the can bodies slide through a prior waterfall, an oxide coating can deposit on the guide surfaces. This coating must be removed periodically to avoid jamming. Further, the sliding action of the open end of the can body on the top guide can cause damage to the open end of the can.

It is thus an object of the present invention to provide a drum device and its method of operation as a substitute for waterfall installations of the prior art.

It is yet a further object of the present invention to provide a drum device and its method of operation capable of rotating can-shaped objects from a first to a second location over a curved surface while avoiding damage to the can bodies and providing a positive means of flow control while avoiding gate structures employed by the prior art.

These and further objects will be more readily apparent when considering the following disclosure and appended claims wherein:

FIG. 1 is a perspective, partially cut-away view of the drum device of the present invention;

FIG. 2 is a cross sectional side view of the present invention; and

FIG. 3 is a partial cross sectional side view taken at an angle of 90° to the view of FIG. 2.

SUMMARY OF THE INVENTION

The present invention deals with a drum device and its method of operation. The device provides for the rotation of can-shaped objects over a curved surface from a first to a second location. The device comprises an inner, hollow, non-rotating, cylindrical member possessing a substantially horizontal longitudinal axis and circular cross section. An outer, hollow, rotating, cylindrical member is oriented along substantially the same longitudinal axis while possessing a slightly larger circular cross section as said non-rotating, cylindrical member to enable the outer, hollow, rotating, cylindrical member to rotate about the inner, hollow, non-rotating, cylindrical member. The outer, rotating, cylindrical member is further characterized as being perforated to enable low pressure established within the inner, hollow, non-rotating, cylindrical member to draw air through the outer, hollow, rotating, cylindrical member in an amount sufficient to secure can-shaped objects to its surface.

An open segment is provided within the surface of the inner, hollow, non-rotating, cylindrical member. The open segment is dimensioned along the longitudinal axis for a length substantially contiguous to the outer, hollow, rotating, cylindrical member and of a circumferential dimension to enable air to be drawn through the open segment and through the perforated outer, hollow, rotating, cylindrical member to adhere the can-shaped objects to the surface of the outer, hollow, rotating, cylindrical member from a first to second location.

Means are then provided by virtue of a variable speed motor for rotating the outer, hollow, cylindrical member about its horizontal longitudinal axis.

DETAILED DESCRIPTION OF THE INVENTION

Turning to FIGS. 1 and 2, an inner, hollow, non-rotating, cylindrical drum member 1 is shown in cutaway and in cross section having partially open end 19. Cylindrical member 1 can be connected at end 19 to a vacuum fan (not shown) causing air to flow in the direction of arrow 15 which results in a low pressure condition established within member 1. Typically, a fan capable of generating air flows on the order of 1800 ft$^3$/min. is employed to create a vacuum of approximately 8 inches of water in the inner cylinder. This can be accomplished with a 5 horsepower motor.

Cylindrical member 1 is also to be provided with open segment 45 which is defined by edges 31 and 32 (FIG. 3) and dimensioned in a fashion which will be more fully developed hereinafter. Obviously, any vacuum or low pressure condition developed within cylindrical member 1 will result in the draw of air in the region encompassing open segment 45.

The metering drum assembly of the present invention is next provided with outer, hollow, rotating, cylindrical member 2. Both inner and outer cylindrical members are provided with substantially circular cross sections and coincident longitudinal axes 34.

The outer, hollow, rotating, cylindrical member is further provided with perforations 13 to enable the low pressure established within inner, hollow, non-rotating, cylindrical member 1 to draw air through the outer, hollow, rotating, cylindrical member 2 through perforations 13 and open segment region 45. Obviously, the air flow in the direction of arrow 15 can be easily adjusted to insure that sufficient draw is created to insure adherence of can-shaped objects 21 to the surface of outer, hollow, rotating, cylindrical member 2 at least within segment region 45. Typically, outer cylinder member 2 possesses a grid of perforations 13, 1 inch by 1 inch, each perforation having a diameter of approximately 0.312 inches.

Rotation of cylindrical member 2 about cylindrical member 1 is created by providing a variable speed motor 8 engaging a drive sprocket 10 which in turn is intended to functionally engage roller chain 35 circumscribing outer cylinder 2 at sprocket 6. Typically, the drive motor can be approximately ¾ horsepower while relative movement between outer cylinder 2 and inner cylinder 1 is facilitated by virtue of bearing member 4. Obviously, bearing 4 provides a substantial impediment to the flow of air such that low pressure drawn within inner, hollow, non-rotating, cylindrical member 1 will draw air through perforations 13 in said outer, hollow, rotating, cylindrical member 2.

It is an essential element of the present invention to provide a configuration whereby can-shaped objects 21 are to be maintained by means of air drawn through perforations 13 on the surface of rotating cylinder 2 only in a specific predetermined arc of rotation, such as shown in FIG. 3. Ideally, the arc of rotation is approximately 90° whereby can-shaped objects 21 are received from the surface of air conveyor 16 having topmost horizontal surface 18 and slots 17 for the directional discharge of air therethrough.

Turning again to FIG. 3, cans 21 are to be received from horizontal surface 18 having a substantially vertical orientation in a "12 o'clock" position. Cans 21 are then caused to adhere to the perforated rotating surface of cylindrical member 2 until can-shaped objects 21 reach a "3 o'clock" position and exhibit a substantially horizontal orientation. At that point, air drawn through perforations 13 diminishes and the can-shaped objects fall from the surface of rotating drum 2. To further facilitate removal, a stripper plate 14 can be provided tangential to member 2 although, in most instances, gravitational attraction applied to the can-shaped objects themselves is sufficient to insure discharge from the rotating, cylindrical members' surface.

The above-recited method is accomplished by providing open segment 45 within the surface of inner, hollow, non-rotating, cylindrical member 1. The open segment is dimensioned along longitudinal axis 32 for a length substantially contiguous to that of the outer, hollow, rotating, cylindrical member 2. The open segment is provided with a circumferential dimension governed by the angle $\theta$ (FIG. 3) to enable air to be drawn through the open segment and through perforated, outer, hollow, rotating, cylindrical member 2 to adhere the can-shaped objects to the surface of cylinder 2 only as provided above. In most instances, $\theta$ is approximately 110° which results in a slight "overlap" between the "12 o'clock" and "3 o'clock" positions (FIG. 3) enabling the can-shaped objects to adhere to the surface of rotating member 2 for an approximate 90° arc.

It is further to be noted that the metering drum assembly of the present invention can also act to regulate the flow of can-shaped objects as an alternative to gate structures of the prior art. As can-shaped objects 21 move from the air conveyor 16, they are captured by the vacuum established through perforations 13. If rotation of cylindrical member 2 stops, the flow of can-shaped objects also stops as line pressure from air conveyor 16 is not generally of sufficient strength to overdrive the drum device or to slide the can-shaped objects on the surface of rotating member 2. As such, the present invention advantageously replaces the typical prior art gate in waterfall devices. Where gates of the prior art are either opened or closed, the present drum device can be adjusted from a zero to a predetermined maximum speed.

Today's high speed can-handling processing lines require continuous flow regulation with a rapid response time. Intermittent flow produced by a gate is not adequate because the response time of a mass of can-shaped objects is slow due to the inertia of the pack.

I claim:

1. A drum device for the rotation of can-shaped objects over a curved surface from a first to a second location comprising:
   (a) an inner, hollow, non-rotating, cylindrical member possessing a substantially horizontal longitudinal axis and circular cross section;
   (b) an outer, hollow, rotating, cylindrical member oriented along substantially the same longitudinal axis and possessing a slightly larger circular cross section as said non-rotating, cylindrical member to enable said outer hollow, rotating, cylindrical member to rotate about said inner, hollow, non-rotating, cylindrical member, said outer, rotating, cylindrical member being further characterized as being perforated to enable low pressure established within said inner, hollow, non-rotating, cylindrical member to draw air through said outer, hollow, rotating, cylindrical member in an amount sufficient to secure said can-shaped objects thereto;
   (c) an open segment within the surface of said inner, hollow, non-rotating, cylindrical member, said open segment being dimensioned along said longitudinal axis for a length substantially contiguous to said outer, hollow, rotating, cylindrical member and of a circumferential dimension to enable air to be drawn through the open segment and through the perforated outer, hollow, rotating, cylindrical member to adhere said can-shaped objects to the surface of said outer, hollow, rotating, cylindrical member from said first to second locations; and (d) means for rotating said outer, hollow, rotating, cylindrical member about said substantially horizontal longitudinal axis.

2. The drum device of claim 1 wherein at said first location, said can-shaped objects engage said outer, hollow, rotating, cylindrical member in a substantially vertical orientation and at said second locating cease to engage said outer, hollow, rotating, cylindrical member in a substantially horizontal orientation.

3. The drum device of claim 2 wherein said first location and second location are separated from one another by an approximately 90° arc along the surface of said outer, hollow, rotating, cylindrical member.

4. The drum device of claim 1 wherein said open segment is dimensional circumferentially approximately 110° along the surface of said inner, hollow, non-rotating, cylindrical member.

5. The drum device of claim 1 wherein said can-shaped objects are fed to said first location in a substantially vertical orientation upon the surface of an air conveyor.

6. The drum device of claim 1 wherein said outer, hollow, rotating, cylindrical member is maintained in rotational engagement with peripheral edges of said inner, hollow, non-rotating, cylindrical member by means of a bearing.

7. The drum device of claim 6 wherein said bearing provides a substantial impediment to the flow of air such that low pressure drawn within said inner, hollow, non-rotating, cylindrical member will draw air through the perforations in said outer, hollow, rotating, cylindrical member.

8. The drum device of claim 1 wherein a stripper plate is located tangentially to the outer, hollow, rotating, cylindrical member and proximate to said second location.

9. A method for conveying can-shaped objects from a first location in a substantially vertical orientation to a second location in a substantially horizontal orientation, said method comprising:

(a) providing an inner, hollow, non-rotating, cylindrical member possessing a substantially horizontal, longitudinal axis and circular cross section;

(b) providing an outer, hollow, rotating cylindrical member oriented along substantially the same longitudinal axis and possessing a slightly larger circular cross section as said non-rotating, cylindrical member to enable said outer hollow, rotating, cylindrical member to rotate about said inner, hollow non-rotating, cylindrical member, said outer rotating, cylindrical member being further characterized as being perforated to enable low pressure established within said inner, hollow, non-rotating, cylindrical member to draw air through said outer, hollow, rotating, cylindrical member in an amount sufficient to secure said can-shaped objects thereto;

(c) providing an open segment within the surface of said inner, hollow, non-rotating, cylindrical member, said open segment being dimensioned along said longitudinal axis for a length substantially contiguous to said outer, hollow, rotating, cylindrical member and of a circumferential dimension to enable a vacuum to be drawn through the open segment and through the perforated outer, hollow, rotating, cylindrical member to adhere said can-shaped object to the surface of said outer, hollow, rotating, cylindrical member from said first to said second locations;

(d) providing low pressure within said inner, hollow, non-rotating, cylindrical member such that can-shaped objects engaging the surface of said outer, hollow, rotating, cylindrical member at said first location are caused to adhere to the surface of said outer, hollow, rotating, cylindrical member; and (e) causing air to cease being drawn through the perforated outer, hollow, rotating, cylindrical member proximate said second location allowing said can-shaped objects to loose their adherence to the surface of said outer, hollow, rotating, cylindrical member while in a substantially horizontal orientation.

10. The method of claim 9 wherein said first location and second location are separated from one another by an approximately 90° arc along the surface of said outer, hollow, rotating, cylindrical member.

11. The method of claim 9 wherein said open segment is dimension circumferentially approximately 110° along the surface of said inner, hollow, non-rotating, cylindrical member.

12. The method of claim 9 wherein said can-shaped objects are fed to said first location in a substantially vertical orientation upon the surface of a air conveyor.

* * * * *